United States Patent Office
3,463,804
Patented Aug. 26, 1969

3,463,804
PREPARATION OF α-CYANOACRYLIC ESTERS
Neil Hunter Ray and Peter Doran, Northwich, England, assignors to Imperial Chemical Industries Limited, London, England, a corporation of Great Britain
No Drawing. Filed Mar. 6, 1967, Ser. No. 620,591
Claims priority, application Great Britain, Apr. 6, 1966, 15,344/66
Int. Cl. C07c *121/40*
U.S. Cl. 260—465                                                6 Claims

ABSTRACT OF THE DISCLOSURE

Monomeric esters of α-cyanoacrylic acid are prepared by heating for several hours under reflux a mixture of the corresponding ester of cyanoacetic acid, formaldehyde, anthracene and a basic catalyst in an inert, non-aqueous organic solvent. Water formed in the reaction is distilled out of the system, preferably as an azeotrope with the organic solvent and the ester is obtained in the form of its adduct with anthracene. It is displaced from the adduct by heating the latter alone or with an olefinic compound preferably maleic anhydride. Preferred reaction temperatures are 60°–100° C. and suitable basic catalysts, which are required to the extent of about 0.10 to 0.50% by weight of the reactants, are piperidine, quinoline, alkali metal hydroxides and alkoxides. Monomeric esters of α-cyanoacrylic acid, particularly methyl and ethyl α-cyanoacrylates, are known adhesives of outstanding value. Their anthracene adducts are stable over long periods and show no tendency for the esters in them to polymerise.

BACKGROUND OF THE INVENTION

Field of the invention

Esters of substituted acrylic acids.

Description of prior art

Known methods of making esters of α-cyanoacrylic acid from the corresponding esters of cyanoacetic acid and formaldehyde, as described for example in U.S. Patents 2,467,927 and 2,721,858, yield the ester in a polymeric form which has to be depolymerised to obtain the useful monomer. Depolymerisation usually requires the polymer to be heated under much reduced pressure in the presence of a polymerisation inhibitor.

SUMMARY OF THE INVENTION

Preparation of a monomeric ester of α-cyanoacrylic acid by heating a mixture of the corresponding ester of cyanoacetic acid, formaldehyde, anthracene and a basic catalyst in an inert, non-aqueous, organic solvent to give an adduct of the monomeric ester and anthracene. The monomeric ester is displaced from the adduct by heating the latter alone or with an olefinic compound, for example maleic anhydride.

This invention relates to an improved process for making esters of α-cyanoacrylic acid and particularly to one by which the ester is obtained in monomeric form without the need for a reaction stage in which the polymeric form is depolymerised.

Monomeric esters of α-cyanoacrylic acid, particularly the lower alkyl esters, possess great utility as adhesives. It is known to make them by reacting the corresponding esters of cyanoacetic acid with formaldehyde in the presence of a basic condensation catalyst in various reaction media, but in this way they are formed as polymers that have to be depolymerised in order to obtain the monomeric esters. On a manufacturing scale this depolymerisation involves heating the polymer at 100° C.–175° C. under reduced pressures of the order of 1 to 2 mm. Hg in the presence of an acidic polymerisation inhibitor.

We have now found a method of making esters of α-cyanoacrylic acid from esters of cyanoacetic acid and formaldehyde in which polymer formation is avoided and no depolymerisation stage is necessary. It depends on the formation of an anthracene adduct of an ester of α-cyanoacrylic acid in which owing to the double bond of the latter being temporarily saturated there is no tendency for polymerisation to occur. From the adduct the monomeric ester can be displaced by heating under atmospheric pressure alone or with another olefinic molecule, for example a gaseous olefin or maleic anhydride.

Thus the invention provides a process for making a monomeric ester of α-cyanoacrylic acid comprising heating a mixture of the corresponding ester of cyanoacetic acid, anthracene, formaldehyde and a basic catalyst as hereinafter defined in an inert non-aqueous organic solvent, forming thereby an adduct of anthracene and monomeric ester of α-cyanoacrylic acid, removing water from the reaction system, and displacing the monomeric ester of α-cyanoacrylic acid from its anthracene adduct.

The displacement of monomeric α-cyanoacrylic ester from its anthracene adduct can be achieved by first separating the adduct itself from the reaction system and then heating it in a suitable solvent for example benzene, toluene, alone or with another olefinic compound, for example maleic anhydride, for several hours. Alternatively the adduct can remain in the reaction system and the olefinic compound be added thereto and the whole heated. Maleic anhydride is a very convenient displacing compound since a minor proportion of it remaining in the α-cyanoacrylic ester stabilises the latter against polymerisation during storage. We have also shown that the anthracene adducts are stable over very long periods and show no tendency for the esters to polymerise and are consequently convenient forms for storing the esters. The anthracene adducts may for some purposes be used as adhesives by themselves, or in a suitable solvent.

The process is applicable to any ester of cyanoacetic acid and can thus be used for preparing any corresponding ester of α-cyanoacrylic acid. Of the latter those that possess the greatest utility as adhesives are alkyl esters containing from one to about eight carbon atoms in the alkyl group, the cyclohexyl ester and the phenyl ester. The methyl and ethyl esters possess outstanding adhesive properties and for their preparation the process is particularly applicable.

Suitable inert solvents for the reaction system include benzene, toluene and xylene. The water formed in the reaction is advantageously removed from the system by permitting it to form an azeotrope with the solvent and distilling it out. Benzene and mixtures of benzene and toluene are particularly suitable solvents in this respect.

Suitable reaction temperatures are from about 60° C. to 100° C. and it is convenient to add the formaldehyde in the form of a suspension of paraformaldehyde in dry benzene or toluene dropwise over a period of up to 10 hours, preferably ¼ to 1 hour, to the refluxing mixture of cyanoacetic ester, anthracene and solvent. After all the formaldehyde has been added the reaction mixture is refluxed for a further period.

In this specification a basic catalyst is defined as a basic condensation material, for example organic bases such as piperidine and quinoline, inorganic bases such as sodium or potassium hydroxides, dialkylamines, alkali metal alkoxides. The amounts required are small, for example 0.1 to 0.5% by weight of the reactants.

Examples 1–3 illustrate the formation of monomeric alkyl α-cyanoacrylate/anthracene adducts; Examples 4 and 5 illustrate respectively displacement of ethyl and methyl α-cyanoacrylates from their previously separated anthracene adducts; Example 6 illustrates the formation of the monomeric ethyl α-cyanoacrylate/anthracene adduct and the displacement therefrom of the ester without previously separating adduct from the reaction system in which it is formed. All parts are parts by weight.

EXAMPLE 1

22.6 parts of ethyl cyanoacetate, 35.6 parts anthracene and 5 drops piperidine were brought to reflux temperature in 375 mls. of benzene. The benzene was distilled until dry using a Dean and Stark adaptor. Six parts of paraformaldehyde were stirred in 200 parts of dry benzene and the mixture added dropwise over a period of 5¾ hours to the refluxing solution. The resulting solution was refluxed for a further 16 hours before cooling to 0° C. 16.2 parts of unreacted anthracene were crystallised out and filtered off. After removing part of the benzene by distillation a further 2 parts of anthracene were recovered. The remaining benzene was distilled off and after drying in a vacuum oven for 12 hours there remained 56 parts of residue which crystallised out on standing. This was washed on a filter with 25 mls. ethanol leaving 23.7 parts of white crystalline 11-cyano-11-carboethoxy-9,10-dihydro-9,10-endoethanoanthracene, M.P. 118° C. Yield 78.3%.

*Analysis.*—Found: C, 79.6%; H, 5.8%; N, 4.3%; O, 11.1%. Calculated: C, 79.4%; H, 5.6%; N, 4.6%; O, 10.5%.

EXAMPLE 2

35.6 parts of anthracene, 20.5 parts methyl cyanoacetate, 5 drops of piperidine and 0.5 part hydroquinone were refluxed in a mixture of 250 parts of toluene and 75 parts of benzene using a Dean and Stark adaptor to remove water. 6.5 parts paraformaldehyde in suspension in 100 parts toluene were added dropwise over a period of 2 hours. After refluxing for another hour, the benzene and a little toluene were removed together with any residual water in the solution. The remaining solution was boiled under reflux for a total of 20 hours. 7 parts of anthracene were recovered on cooling. After removing the toluene and treating the residual gummy material with ethanol, 34.9 parts of 11-cyano-11-carbomethoxy-9,10-dihydro-9,10-endoethanoanthracene, M.P. 91° C.–92° C. were obtained. This corresponds to a yield of 75.2%.

EXAMPLE 3

40 parts of anthracene, 22.6 parts of methyl cyanoacetate, 5 drops of piperidine, 0.5 part of hydroquinone were refluxed in a mixture of 300 parts of toluene and 75 parts of benzene using a Dean and Stark adaptor to remove water. 6.5 parts of paraformaldehyde in suspension in 100 parts of toluene were added dropwise over a period of 20 minutes. The benzene and a little toluene were removed by distillation together with any residual water and the remaining solution was refluxed for a further 20 hours. On cooling, 2.7 parts of anthracene were filtered off. After removing the solvent, 60 parts of 11-cyano-11-carbomethoxy - 9,10 - dihydro - 9,10-endoethanoanthracene (M.P. 91° C.–92° C.) were obtained. This corresponds to an efficiency of 92.5% and a yield of 99%.

EXAMPLE 4

10 parts of the ethyl α-cyanoacrylate/anthracene adduct, 3.2 parts of maleic anhydride and 0.25 part of phosphorus pentoxide were refluxed for 18 hours in 30 parts of dry toluene. On cooling in ice, 6 parts of the maleic anhydride/anthracene adduct crystallised out, M.P. 263° C. Toluene was removed from the filtrate at 65° C. and 200 mm. Hg by distillation. On reducing the pressure to about 6 mm. Hg, 2.5 parts of liquid were distilled and collected. This was shown to be ethyl α-cyanoacrylate containing a little maleic anhydride and corresponded to a yield of 50%.

EXAMPLE 5

20 parts of the methyl α-cyanoacrylate/anthracene adduct, 5 parts of maleic anhydride and 0.5 part of phosphorus pentoxide were refluxed for 20 hours in 50 parts of dry toluene. On cooling 10 parts of the maleic anhydride/anthracene adduct crystallised and were filtered off. From the filtrate toluene was distilled away at 65° C. and 200 mm. Hg and afterwards the pressure was reduced to 6 mm. Hg and 4 parts of a liquid distilled which was identified as methyl α-cyanoacrylate.

EXAMPLE 6

17.8 parts of anthracene, 11.3 parts of ethyl cyanoacetate, 2 drops of piperidine, 0.1 parts of hydroquinone were refluxed in a mixture of 75 parts of xylene and 50 parts of benzene using a Dean and Stark adaptor to remove 10 parts of benzene and any water present. 3.25 parts of paraformaldehyde in suspension in 75 parts of dry benzene were added dropwise over a period of 30 minutes. The benzene and a little xylene were removed by distillation together with any residual water and the remaining solution was refluxed for a further 18 hours. 9.0 parts of maleic anhydride, 0.75 part of phosphorus pentoxide, 0.75 part of hydroquinone and 15 parts of dry xylene were added to the solution which was then refluxed for 18 hours. On cooling 16.5 parts of the maleic anhydride/anthracene adduct crystallised out and were filtered off. 0.2 part of phosphorus pentoxide were added to the solution from which the xylene was removed under reduced pressure by distillation. The friction boiling at 66° C. and 6 mm. Hg was shown to consist of 6 parts of ethyl α-cyanoacrylate.

What we claim is:

1. In a process for producing a monomeric ester of α-cyanoacrylic acid from a mixture of the corresponding ester of cyanoacetic acid, formaldehyde, with basic condensation catalysts and an inert, non-aqueous organic solvent by heating said mixture sufficiently to form the said monomeric ester of α-cyanoacrylic acid, the improvement comprising providing a sufficient amount of anthracene in the said mixture to form an anthracene adduct of the ester of α-cyanoacrylic acid in which the double bond of the said ester of α-cyanoacrylic acid is saturated and prevents polymerization thereof, removing water from the reaction system and heating the said adduct sufficiently to displace the said monomeric ester of α-cyanoacrylic acid from the said adduct.

2. The process of claim 1 wherein the said ester of α-cyanoacrylic acid is an alkyl ester of up to 8 carbon atoms, a cyclohexyl ester and a phenyl ester, the basic condensation catalyst is selected from organic bases, inorganic bases and alkali metal alkoxides, and the amount of anthracene present is sufficient to form an adduct having equimolar portions of the anthracene and the ester of α-cyanoacrylic acid.

3. The process of claim 1 where the reaction which forms the ester of α-cyanoacrylic acid is at a temperature of from 60° C. up to the reflux temperture of the said inert, non-aqueous, organic solvent, and the adduct formation is carried out at a temperature up to the reflux temperature of the mixture in which the adduct is formed.

4. The process of claim 3 wherein the basic condensation catalyst is selected from piperidine, quinoline, alkali metal hydroxides and dialkylamines and are present in amounts from 0.1 to 0.5% by weight of the reactants.

5. A process as claimed in claim 1 in which the ester of cyanoacetic acid is selected from methyl and ethyl cyanoacetates.

6. Adducts of anthracene and a monomeric ester of α-cyanoacrylic acid selected from the group consisting of 11-cyano-11-carboethoxy-9,10-dihydro - 9,10-endoethanoanthracene and 11-cyano-11-carbomethoxy-9,10-dihydro-9,10-endoethanoanthracene.

References Cited

UNITED STATES PATENTS 3,254,111  5/1966  Hawkins et al.

JOSEPH P. BRUST, Primary Examiner

U.S. Cl. X.R.

260—346.6, 464, 465.4